United States Patent [19]

Fitzemeyer et al.

[11] Patent Number: 4,749,992
[45] Date of Patent: Jun. 7, 1988

[54] UTILITY MONITORING AND CONTROL SYSTEM

[75] Inventors: Edward L. Fitzemeyer, Melrose, Mass.; Bill M. Steinhart, Londonderry, N.H.; Carmelo Agostino, Medford, Mass.

[73] Assignee: Total Energy Management Consultants Corp. (TEMCO), Melrose, Mass.

[21] Appl. No.: 881,910

[22] Filed: Jul. 3, 1986

[51] Int. Cl.⁴ .............................................. G08B 23/00
[52] U.S. Cl. .......................... 340/870.02; 340/310 A; 340/825.07
[58] Field of Search ........ 340/870.02, 310 A, 310 CP, 340/310 R, 825.07

[56] References Cited

U.S. PATENT DOCUMENTS

| | | | |
|---|---|---|---|
| 3,973,240 | 8/1976 | Fong | 340/310 A |
| 4,085,287 | 4/1978 | Kullman et al. | 340/870.02 |
| 4,322,842 | 3/1982 | Martinez | 370/11 |
| 4,361,766 | 11/1982 | deMontgolfier et al. | 340/310 A |
| 4,504,831 | 3/1985 | Jahr et al. | 340/870.02 |
| 4,513,415 | 4/1985 | Martinez | 370/92 |
| 4,517,562 | 5/1985 | Martinez | 340/825.07 |
| 4,518,822 | 5/1985 | Martinez | 179/2 E |
| 4,628,313 | 12/1986 | Gombrich et al. | 340/870.02 |

OTHER PUBLICATIONS

Honeywell Promotional Flyer for PLC 720 System.
Butler Controls Division, Butler Manufacturing Company; Installation Guides for Model 2033 Pulse-Counting Transponder, Model 2021B PLC Receiver and Model 2032 PLC Transponder.
Robinton Products, Inc., Promotional Brochure for Load Profile Recorders.

Primary Examiner—John W. Caldwell, Sr.
Assistant Examiner—Tyrone Queen
Attorney, Agent, or Firm—Lahive & Cockfield

[57] ABSTRACT

A remote utility reading and control system includes a central utility use data bank which communicates by communications link with a plurality of relay modules located at power sub-distribution transformers. Each relay module separately addresses and communicates by PLC with a number of site units in its locality. The site units may include on/off controls for buildings, light systems or single pieces of equipment, or may include utility meters or real power meters. The PLC communication utilizes error checking and message verifying to acquire valid status or measurement signals, which are then transmitted to the central data bank. A CRC error code identifies faulty messages. After multiple interrogation, five responses are stored, and a message is confirmed only when three of five reponses are identical. Systems for electricity, water, and gas are described.

18 Claims, 4 Drawing Sheets

UTILITY MONITORING AND CONTROL SYSTEM

TECHNICAL FIELD

The present invention relates to systems for measuring the power consumption of distributed units, and for controlling power availability to those units.

It is known in the art to communicate over the power lines within a building so as to, for example, actuate a power switch from a remote location. Systems for this purpose employ a carrier signal injected over the power lines of the building to carry coded information to a switching unit, which may, for example, control power to the illumination system, or to a particular machine. The switching unit includes a subsystem for demodulating and extracting the control signal from the power line carrier (PLC) signal. Building systems employing such control units may optimize the power consumption from a given utility according to a desired program.

At the other extreme of the utility distribution systems, a utility company can control the distribution or flow of power to portions of its distribution system by switching in or out various portions of the distribution system at selected switching stations. Such switching can be controlled by control signals delivered over normal communications links, for example, telephone lines. Power distribution control of this type may be done in accordance with anticipated power requirements, the economics of power utilization from diverse sources, and, in extreme cases, the necessity to shut down portions of the system.

It is not believed, however, that any effective monitoring or control system between distinct end user sites and the power distribution network is presently available or has been proposed.

SUMMARY OF THE INVENTION

The invention relates to a system for both measuring power consumption of distributed units at local sites, and for controlling power availability to those units. The units controlled may be either a generalized power user such as an individual residence, factory, apartment, or the like, on the one hand, or on the other hand, may be an individual heavy use electrical appliance or machine at the premises of such a user. The latter category includes devices such as water heaters, air conditioners, milling machines, and the like.

The overall operation of the system effects, principally from a centralized location, readout of power usage at remote locations, and provides, either alternatively or in conjunction with the readout, means for controlling power availability to the individual remote locations. Thus in an electrical brown-out situation, the invention permits cutting off of power at selective times and to selective locations or particular machines. It further permits the return of power on a selective basis to sites or machines after a black-out.

The system includes a computer to communications link interface which permits a computer having a power user and use control database therein to operate as a central control unit to communicate with a plurality of remote local relay modules. The communication to each remote local relay module is effected via cable TV lines, telephone lines, or a radio link such as an FM radio, satellite or microwave link. Each relay module serves to relay use or control information between the central control station and a plurality of local user sites located in the neighborhood of the relay module. As used in a public electrical power distribution system, each relay module is located at the secondary side of a transformer and communicates with the individual sites using PLC signals over the power lines. A microprocessor generates logic signals to activate either control units such as simple switches, or measuring units such as power readout devices. The power line carries the control and readout polling signals to the individual site and carries return status or measurement signals from the site units to the relay module. Communications between the relay module and the site unit are digitally encoded with a cylclic redundancy code. In polling the site unit, the relay module interrogates the unit and stores the use or status messages returned by the unit. Each unit is interrogated multiple times, and successive responses compared to the preceding responses. Only when three successive responses are identical is the information accepted for storage or retransmission to the central station. Otherwise an error code is entered and the site is polled again at a later time.

BRIEF DESCRIPTION OF THE DRAWINGS

These and other features of the invention will be understood with reference to the drawings.

DETAILED DESCRIPTION

Figure 1:
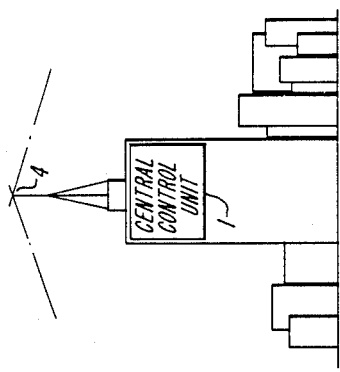
FIG. 1 shows a pictorial schematic view of a system according to the invention.
Figure 1:
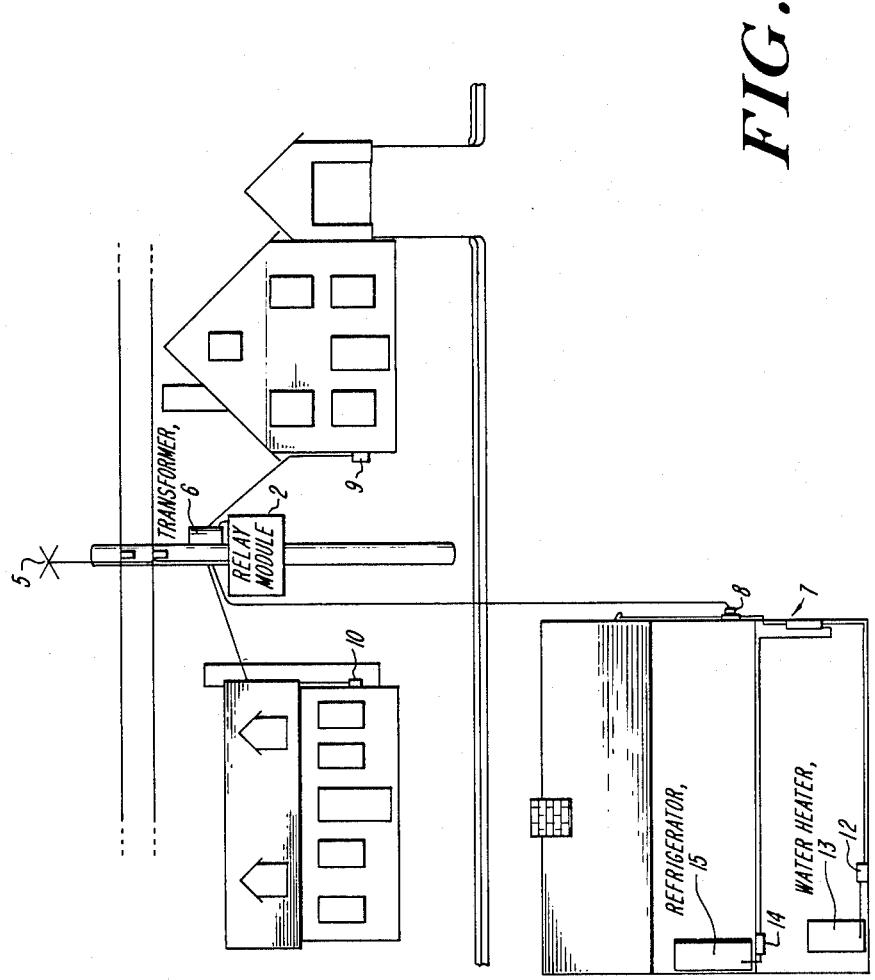

FIG. 1 shows a pictorial schematic view of a system according to the invention in which a central control unit 1 communicates, via telephone lines or radio waves, with a plurality of distributed relay modules 2. In the example shown, the communication is effected by radio waves with units 1, 2 each having a respective antenna 4, 5 for sending or receiving FM radio communications. Telephone lines, local cable TV lines or other effective communications links may be used. Each relay module 2 is located at the secondary side of a power transformer 6 in a power distribution system from which it draws power. Preferably each unit possesses a backup battery power supply to permit operation during power system failures. Relay module 2 is connected across the power lines so as to inject power line carrier (PLC) signals into the line for receipt by site units 8, 9, 10 at distinct utility user locations, referred to herein as sites.

FIG. 1 shows, by way of example, one user site 7 having three distinct site units for monitoring or controlling the flow of electric power thereto. A first site unit 8 is fitted to a power consumption meter for providing, when interrogated, an indication of the current power consumption level, or the cumulative power use reading. A second site unit 12 at the same site controls the delivery of power to a specific appliance, shown as a water heater 13. Unit 12 includes an on/off relay for connecting or interrupting power, and also includes a logic element to provide a status signal indicative of the on/off state. A third site unit 14 is shown connected to a refrigerator 15. Unit 14 may be identical to unit 12. Each unit 8, 12, 14 may be separately addressed by the relay module 2.

As discussed more fully in relation to FIGS. 3 through 6 below, the plurality of local relay modules 2 provide a distributed PLC monitoring and control system. The modules may operate under program instructions from the central control, or may each contain fixed instructions for selectively controlling the site units in its locale responsive to an occurrence of a defined power condition, such as a brown-out, or such as the resumption of power following a black-out.

The central control unit 1 of FIG. 1 may be a general purpose computer such is as commonly used for managing the customer billing and use database of a large utility. The database may, for example, list each power user within a public power distribution system, and may include control data, for example, listing all water heaters in the system and control instructions for enabling power flow to the water heaters only at specific times. Central unit 1 further includes an interface to a communications link for communicating with the relay units 2. The interface may be a modem, for connecting to telephone lines, or other interface for connection to cable TV lines or to a microwave or radio communications link.

Figure 2:
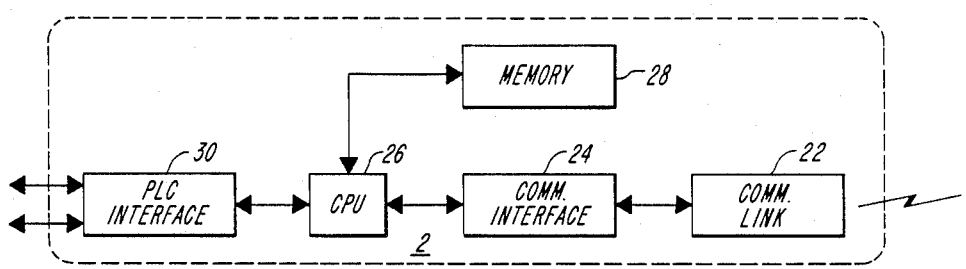
FIG. 2 shows a block diagram of a local relay module of the system.

FIG. 2 shows a block diagram of a representative local relay unit 2. As shown, unit 2 includes an interface 24, which receives data signals from and provides data signals to the central unit 1 of FIG. 1 over communications link 22. Interface 24 communicates the data signals in a formatted digital form with a central processing unit 26 operating under control of instructions in a memory 28. Processing unit 26 also receives data from and provides data to a PLC interface 30. Interface 30 encodes the data provided to it as a power line carrier signals for transmission along the utility lines to site units as discussed above, and further receives and decodes power line carrier signals sent from the site units.

Figure 3:
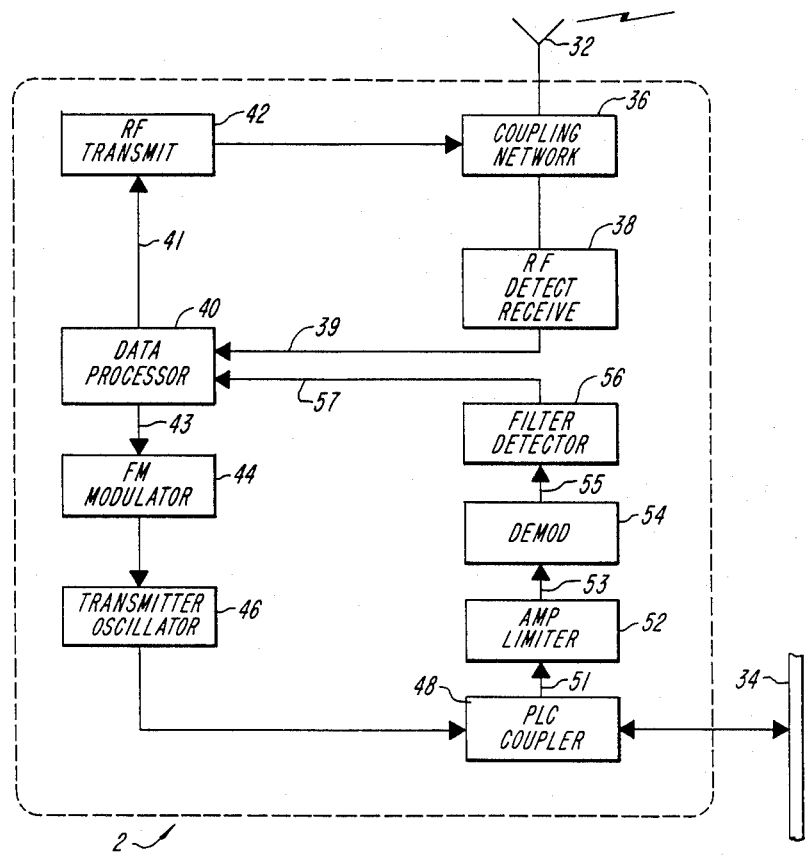
FIG. 3 shows a further block diagram of a local relay module.

FIG. 3 is a block diagram of a relay module 2 of the system of FIGS. 1 and 2. As shown, the relay module 2 is coupled to the central system via antenna 32, and communicates with the local sites via power line 34. For receiving communications from the central computer, antenna 32 connects, via a coupling network 36 to an RF detector/receiver 38 which processes the received RF signal to extract the digital words carried thereby. The output of the detector/receiver 38 is fed via line 39 to a data processor 40. Processor 40 in turn communicates back to the central control 1 (FIG. 1) by providing digital output data along line 41 to RF transmitter 42 which is connected to the antenna 32 via coupling network 36 to broadcast the information to the central control.

Module 2 also communicates with a number of site units using power line carrier (PLC) signals. For this communication, digital data signals are provided along line 43 to FM modulator 44 and transmitter oscillator 46, which is coupled through power line coupler 48 to the power line 34. In this manner, relay module 2 communicates with the site units such as units 8, 9, 10, 12, 14 of FIG. 1.

For receiving information back from the site units along the power line 34, power line coupler 48 feeds via line 51 to amplifier limiter 52 which provides an amplified limited PLC signal along line 53 to demodulator 54. The output of demodulator 54 passes along line 55 to a filter/detector 56 whose output comprises a digital word. This output is provided to the data processor along line 57. Thus the relay module 2 operates under the control of data processor 40 to communicate along power line 34 with the site units, and by radio link with the central controller.

Figure 4:
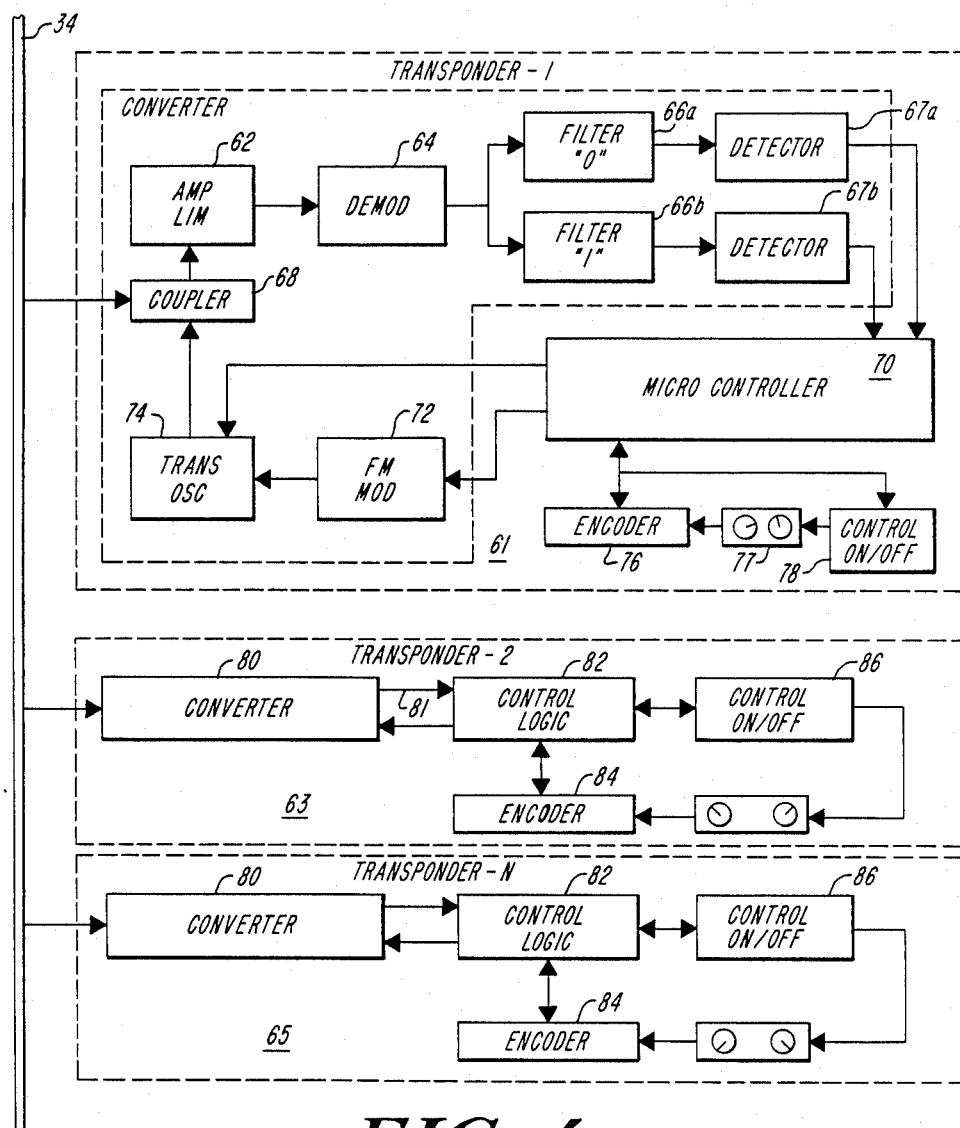
FIG. 4 shows a block diagram of site units for communicating with the relay module of FIGS. 2, 3.

FIG. 4 shows a representative block diagram of three site units 61, 63, 65. Each site unit is a transponder which receives PLC control or interrogation signals from a relay module, performs a measuring or switching function, and transmits, when interrogated, PLC status or measurement signals to the relay module.

The transponder or site unit 61, shown in detail, receives communications from the relay module as follows. A PLC coupler 68 directs the PLC signals from the power line 34 to an amplifier/limiter 62 to provide an amplified limited signal to demodulator 64. The output of demodulator 64 is fed to a filter circuit shown as first and second filters 66a, 66b, which pass a signal indicative of an encoded "0" (filter 66a), or a "1" (filter 66b). The output of each filter is passed to a detector which provides a voltage signal of suitable magnitude to an input port of a microcontroller 70. Transponder 61 communicates to the relay module as follows. The microcontroller output signals pass to an FM modulator 72 and transmitter oscillator 74 to develop PLC signals which are coupled via coupler 68 to the power line 34. The microcontroller is in two-way communication with an encoder unit 76, and control 78. In one embodiment, transponder 61 is fitted to a conventional electric or other utility meter or indicating device 77. The encoder 76 receives an output from the conventional meter 77 and provides a digital representation thereof to the microcontroller 70. In another embodiment, the transponder 61 includes, or is connected to, a power relay for controlling power to a major appliance or machine. The power to the machine is controlled via on/off relay or valve control 78, which in turn provides "on" or "off" status signals to encoder 76 Encoder 76 provides the status signal to the microcontroller in a digital format in accordance with the specified control words of the system, for communication to the relay module. Encoder 76 may also provide control signals from the microcontroller to control 78, to change its "on" or "off" state.

Also schematically shown in FIG. 4 are site units or transponders 63, 65. In this representation, elements 62, 64, 66a, 66b, 67a, 67b, 68, 72, and 74 are schematically labeled as converter 80. The converter is in two-way communication with control logic 82 which in turn is in two-way communication with encoder 84 and on/off control 86. The block diagrams of units 63, 65 correspond to that of unit 61, except that the microcontroller 70 is replaced by control logic 82. Control logic 82 receives the decoded PLC signal along line 81 and includes a first logic circuit responsive to an addressing word provided along line 81 to activate the site unit 63. Control logic 82 further includes circuitry responsive to digital information indicative of interrogation or control commands from the relay unit. This circuitry initiates the provision of a control signal, e.g. indicative of a desired "on" or "off" state, to the on/off control 86, or initiates the provision of an encoded status or use signal from encoder 84 back to the converter for transmission to the relay module. Such control logic 82 may be assembled from basic circuit elements, such as logic gates or a programmable logic array, and need not utilize the microprocessor indicated in transponder 61.

In the preferred embodiment of an electric power monitoring system shown, each relay module is located at a power sub-distribution transformer, and injects its PLC signals across the secondary side of the transformer. Communications from the relay to the sites are modulated at a first PLC carrier frequency and communications from the site units to the relay are modulated at a second PLC carrier frequency. A preferred embodiment utilizes a 200 kHz first frequency and a 180 kHz second frequency. Other embodiments use 36/26 kHz, 25/12.5 kHz, and 10/3 kHz for the respective relay/site carrier frequencies. The preferred 200/180 kHz frequencies are substantially entirely blocked by the sub-distribution transformer from crossing to the primary side and reaching the main power line. This prevents communications between the relay and its site units from interfering with other relay modules and their site units.

The lower carrier frequencies, e.g. 10 kHz/3 kHz may be used where such isolation is not required, for example, in a large isolated user site, such as an industrial complex, in which the signals must pass through transformers between the relay module and one or more of the site units.

According to a preferred embodiment of the invention, relay module 2 of FIG. 3 communicates with the local site units 61, 63, 65 (FIG. 4) using 8-bit digital words.

Figure 6:
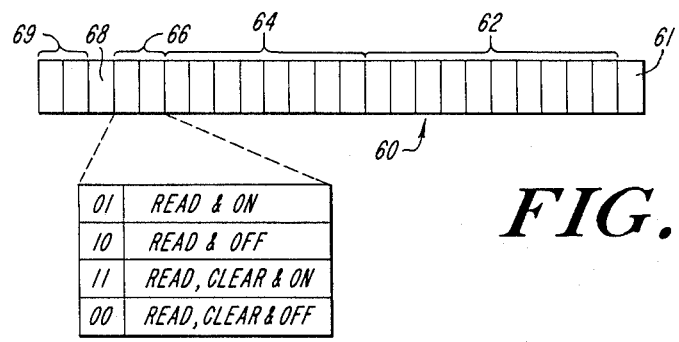
FIG. 6 shows the format of a representative polling message.

FIG. 6 shows a representative digital signal 60 sent by relay module 2 to a site unit. Three eight-bit words, totalling twenty-four bits, are sent. As shown, a single start bit 61 is followed by a ten-bit address 62 which allows up to 1024 site units to be addressed by the relay module. An eight-bit cyclic redundancy code (CRC) 64 follows, to assure message integrity. A two-bit control code 66 permits four different control commands to be sent. Preferably these commands include ON & READ; OFF & READ; READ, CLEAR & ON; and READ, CLEAR & OFF commands. Finally a parity bit 68 and a two-bit stop code 69 complete the message. The message 60 is by way of example, and other formats are possible. For example it may be desirable to address a site by the digitized utility meter number for the site being polled, which would generally require a larger number of address bits.

Preferably however the addresses are digitized numerical addresses, between 0 and $2^{10}$, with each address uniquely addressing one site unit in the locale of the relay module. As discussed above in relation to FIGS. 2 to 4, with the higher carrier frequencies of the relay PLC communication system, local communications are blocked at the distribution transformer, so that relay inquiries and site responses do not pass to other relays, or to identically-addressed site units in the locale of other relays. Each relay module, when receiving or sending information to the central bank is identified, so that the correlation of one or more local site unit addresses with a particular site may be effected at the central bank.

In the presently preferred embodiment, the relay module and the site unit each include a microprocessor for implementing communications, and each message passing between a relay and a site unit includes a cyclic redundancy code (CRC) to assure message integrity. The cyclic redundancy code of each message is calculated by dividing the numerical value of the entire binary block of data (start, address, control, parity, and stop bits) by the value of a generator polynomial, and discarding the quotient. The 8 bit remainder is the CRC, which is inserted as bits 12-19 of the message. At the receiving end the same computation is used to independently derive the CRC, which is then compared with the received CRC. Presently, the generator polynomial $(x^{16}+x^{13}+x^2+1)$ is used to derive the CRC for messages sent from the relay to a site unit, and the polynomial $(x^{16}+x^{10}+x^5 1)$ is used for messages transmitted in the other direction.

The relay of the preferred embodiment also uses a third cyclic redundancy code for communications with the central unit 1. This code is an eight-bit word derived using the generator polynomial $(x^{16}+x^{12}+x^5+1)$. In addition, a user-settable password is used in the relay/central unit communications to assure system integrity. A sixteen-bit address uniquely identifies each relay.

Figure 5:
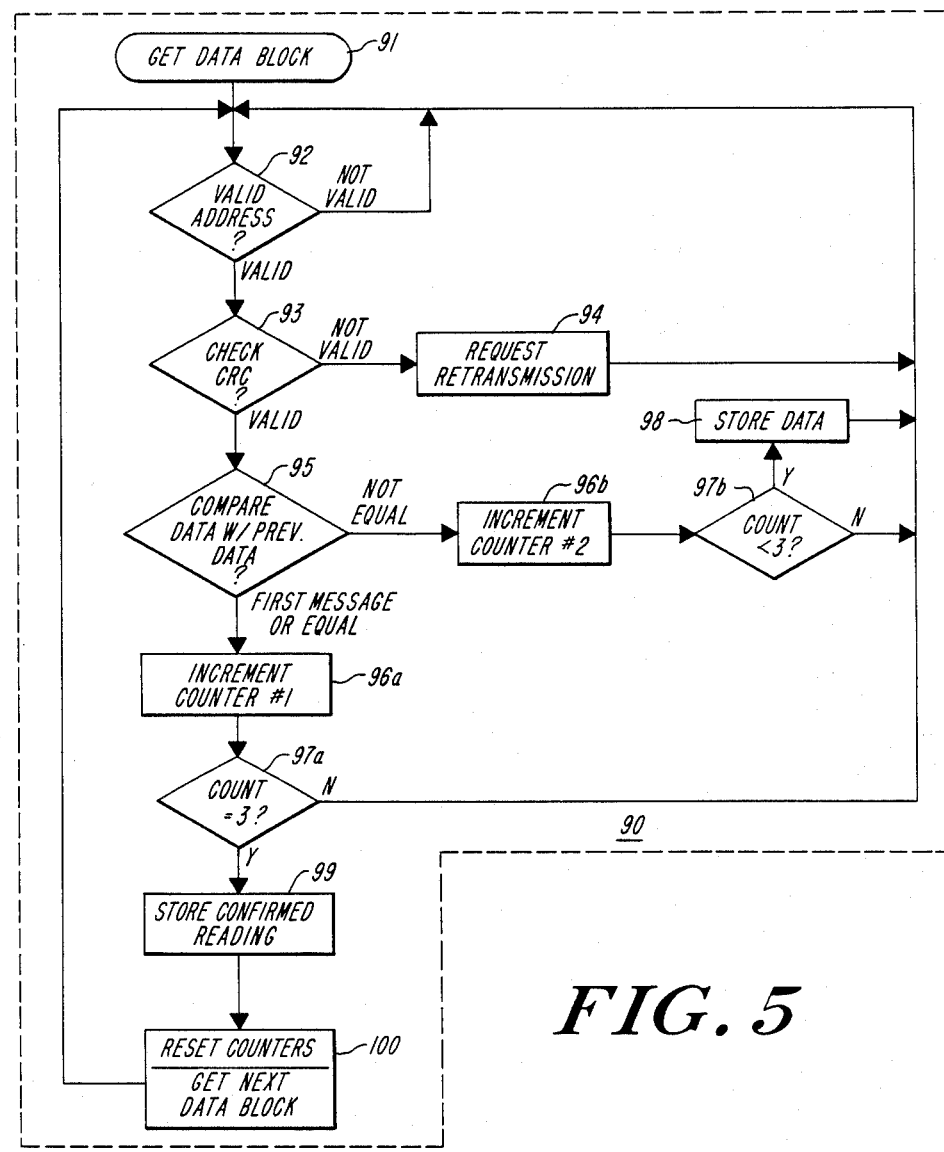
FIG. 5 is a flow chart of the relay module polling.

FIG. 5 shows a flow chart for the operation of a preferred embodiment of a relay module in a system according to the invention. Relay module 2 (FIG. 3) initiates communication by addressing a specific site and sending control and interrogation data to a site unit. The unit responds with a status or unility use signal and the signal is stored. The relay module then transmits one or more stored signals to the central control. Briefly, the relay module interrogates the same site five times sequentially, receiving and holding the responses for comparison. When three of the five responses are determined to be identical, interrogation stops and the common response is stored in relay module memory (28 of FIG. 2) or is immediately retransmitted via the communications link to the central control 1 (FIG. 1). If the relay fails to receive three identical consecutive responses, an error code is developed and stored. The module then proceeds to poll the next site. After completion of a round of polling, the unit re-interrogates the sites which transmitted inconsistent signals.

FIG. 5 shows the PLC communications operation 90. In a first step 91, relay module 2 transmits an interrogation or control message to a site five times; the site transmits five response messages which are received and stored in an input buffer. A first message is checked at step 92 to determine if its address bits are the correct address bits. If not, the message is discarded and the next message from the buffer is inspected. If the address bits are valid, i.e. if it is the address of the site unit, the CRC is checked at step 93 to determine whether any transmission errors have occurred. If the CRC doesn't match, a retransmission request 94 is sent. Otherwise, at step 95, the data bits are compared to the data bits of previous message; in the case of the first message, the data bits are simply stored. For the first message, and subsequently, each time the data bits are found to be equal to the stored bits, a first counter, denoted COUNTER #1, is incremented at step 96a. If the data bits do not match, a second counter, denoted COUNTER #2, is incremented at step 96b.

The counters are checked at steps 97a, 97b, respectively, and as long as neither counter has accumulated a count greater than or equal to three, any new data is stored (step 98) and the next message from the input buffer is checked. If COUNTER #2 accumulates a count of three, i.e., if four messages have been inspected and none agrees with a previously stored message, the protocol terminates with no message confirmed. On the other hand, if COUNTER #1 attains a count of three, indicating that three of the messages were identical, that message is stored at step 99 as a confirmed reading and the counters are reset 100. The relay then proceeds to get the next data block, by transmitting five consecutive messages to the next site unit on its polling list and receiving responses as in step 91. In this manner only when three out of five interrogations produce the same message is a local site message confirmed.

As noted above, the invention may be applied to utilities other than electric utilities. Thus, the site units may include adaptors for converting the reading of a conventional water or gas meter to a digital signal. A preferred such adaptor utilizes an optical beam with a reflector or interruptor affixed to a meter dial or shaft, for generating a signal having a defined proportional relationship to actual utility use. This permits the adaption of conventional meters without the introduction of any mechanical drag or other factors which might render the meter less accurate. For controlling water or gas utilities, a site unit may include a gas or fluid valve assembly.

It will be appreciated that the foregoing invention has been described with reference to a presently preferred embodiment and that such description is by way of illustration only, and the invention is not limited thereto. The invention being thus described, further variations and modifications will occur to those skilled in the art and all such variations and modifications are within the scope of the invention as limited only by the following claims.

What is claimed is:

1. A system for monitoring or controlling utility use at a plurality of use sites in a public utility network, such system comprising
    interface means for interfacing a central information bank with a communications link independent of power lines so as to enable the information bank to communicate with a plurality of separately addressable relay modules,
    at least one relay module, each relay module being located at a power line transformer and electrically interconnected to the secondary side thereof, and including
        (a) master communications means for receiving and sending information along the communications link to the central information bank,
        (b) information storage means for storing information,
        (c) relay communications means, distinct from the master communications means, for separately addressing and communicating with a plurality of local site units via power line carrier (PLC), and
        (d) control means for selectively interconnecting said storage means with said master communication means and with said relay communications means so as to relay information between the central information bank and the plurality of local site units, and
    a plurality of local site units each located at a local site and addressable by a particular relay module, each said local site unit including site PLC communicaitons means for communicating with its particular relay module via power line carrier, each said local site unit also including at least one of means for indicating utility use or means for controlling the flow of utility.

2. A system according to claim 1, wherein a relay module further comprises
    means for repeatedly polling an individual site unit so as to receive multiple responses therefrom, and
    means for comparing said multiple responses received in accordance with said repeated polling from a said site unit so as to identify a consistent message.

3. A system according to claim 2, wherein the communications link is an FM radio link, and wherein the interface means includes means for interfacing the information bank with an FM transmitter and receiver.

4. A system according to claim 3, including a plurality of local relay modules located at respective sub-distribution power transformers, wherein each said module is in communication with a separate plurality of local site units by PLC carrier signal injected across the secondary of the said respective transformer.

5. A system according to claim 2, including a plurality of local relay modules located at respective sub-distribution power transformers, wherein each said module is in communication with a separate plurality of local site units by PLC carrier signal injected across the secondary of the said respective transformer.

6. A system according to claim 4, wherein the utility network is an electrical utility network, and wherein the site units include at least one of means for indicating magnitude of electric power use and means for interrupting electric power use.

7. A system according to claim 5, wherein a relay module and a site unit each include code checking means, for identifying communications errors.

8. A system according to claim 7, wherein the relay module and the site units communicate by digitally encoded messages including a cyclic redundancy code.

9. A system for the communication, between a central use information bank and plural end user sites within a utility distribution system, of utility use information indicative of utility use at the plural end user sites, such system comprising
    interface menas for interfacing the use information bank with a communication ink independent of power lines of said utility distribution system,
    a least one relay module including means for communicating information along the communications link with the information bank, and means for communicating information via power line carrier with a plurality of site units at plural end user sites, and
    a plurality of site units, each located at a specific end user site and responsive at an address signal transmitted by power line carrier from a specific said relay module, for transmitting utility use information of the specific end user site by power line carrier to said specific relay module,
    wherein each said site unit communicates with a single said relay module, and each said relay module is located at a distribution transformer and connected to the secondary side thereof so as to communicate with a plurality of nearby site units, each located at a site receiving power through the said transformer.

10. A system according to claim 9, wherein a relay module includes polling means for polling site units, and wherein the polling means includes means for multiply-polling a site unit and for comparing communications received responsive to said polling from the site unit so as to identify confirmed site use information.

11. A system according to claim 10, wherein a relay module further includes CRC message means, for applying to communications a cyclic redundancy code to identify communications errors.

12. A system according to claim 11, wherein a relay module includes CRC message means utilizing a first generator polynomial for communications sent to an end user site, and utilizing a second generator polynomial received from an end user site.

13. A system according to claim 9, wherein a relay module includes
- polling means for polling site units in power line communication therewith, and
- memory means for storing information received from the said site units, whereby by polling and storing the said information from said site units, the relay module communicates said site unit information from plural site units to the use information bank in a single communication.

14. A control module for controllably communicating with a plurality of PLC-addressable utility usage units, such module comprising
- interface means for receiving and sending communications over a first, external, communications link to a central information source
- polling means for polling over a second, PLC, communications link, a plurality of utility usage units in power line communication with the module so as to communicate usage information to said units and receive usage information from said units
- storage means for storing usage information, and
- relay control means for controlling the interface means, the storage means and the polling means so as to relay utility usage information between said central source and said plurality of utility usage units.

15. A control module according to claim 14, wherein the polling means includes means for multiply-polling a utility usage unit so as to receive multiple responses from the unit, and wherein the control module further comprises means for comparing the multiple responses from the unit to identify confirmed information therein.

16. A control module according to claim 14, further comprising cyclic redundancy code means, for encoding and decoding with a cyclic redundancy code the usage information communicated over the PLC communications link.

17. A control module according to claim 15, further comprising cyclic redundancy code means, for encoding and decoding with a cyclic redundancy code the usage information communicated over the PLC communications link.

18. A relay module for controllably communicating with a plurality of PLC-addressable utility usage units, such module comprising
- interface means for receiving and sending data over a first communications link independent of power lines, to a central information source,
- polling means for polling over a power line communications link, a plurality of separately addressable utility usage units in power line communication with the relay module so as to communicate data to said units and receive data from said units,
- storage means for storing said data, and
- relay control means for controlling the interface means, the storage means and the polling means so as to relay utility usage information between said central source and said plurality of utility usage units by successively polling said plurality of usage units, storing data received therefrom, and subsequently communicating the stored data as a block of data via said interface means.

* * * * *

UNITED STATES PATENT AND TRADEMARK OFFICE
CERTIFICATE OF CORRECTION

PATENT NO. : 4,749,992
DATED : June 7, 1988
INVENTOR(S) : E.L. Fitzemeyer et al.

Page 1 of 2

It is certified that error appears in the above-identified patent and that said Letters Patent is hereby corrected as shown below:

Column 6, line 10, replace "$(x^{16} + x^{10} + x^5 1)$" with --$(x^{16} + x^{10} + x^5 + 1)$--.

Column 6, line 14, replace "the central unit !." with --the central unit 1.--

Column 6, line 24, replace "unility" with --utility--.

Column 8, line 39, replace "communication ink" with --communications link--.

Column 8, line 41, replace "a least" with --at least--.

Column 8, line 47, replace "responsive at an address" to --responsive to an address--.

Column 9, line 16, replace "control" with --relay--.

Column 9, line 33, replace "control" with --relay--.

UNITED STATES PATENT AND TRADEMARK OFFICE
CERTIFICATE OF CORRECTION

PATENT NO. : 4,749,992

DATED : June 7, 1988

INVENTOR(S) : E.L. Fitzemeyer et al.

It is certified that error appears in the above-identified patent and that said Letters Patent is hereby corrected as shown below:

Column 10, line 4, replace "control" with --relay--.

Column 10, line 9, replace "control" with --relay--.

Signed and Sealed this

Sixth Day of June, 1989

Attest:

DONALD J. QUIGG

Attesting Officer

Commissioner of Patents and Trademarks

REEXAMINATION CERTIFICATE (2905th)
United States Patent [19]
Fitzemeyer et al.

[11] B1 4,749,992
[45] Certificate Issued Jun. 11, 1996

[54] UTILITY MONITORING AND CONTROL SYSTEM

[75] Inventors: Edward L. Fitzemeyer, Melrose, Mass.; Bill M. Steinhart, Londonderry, N.H.; Carmelo Agostino, Medford, Mass.

[73] Assignee: Total Energy Management Consultants Corp. (TEMCO), Melrose, Mass.

Reexamination Request:
No. 90/002,674, Mar. 13, 1992

Reexamination Certificate for:
Patent No.: 4,749,992
Issued: Jun. 7, 1988
Appl. No.: 881,910
Filed: Jul. 3, 1986

Certificate of Correction issued Jun. 6, 1989.

[51] Int. Cl.⁶ .................................................. G08B 23/00
[52] U.S. Cl. .............. 340/870.02; 340/310.01; 340/825.07
[58] Field of Search ............ 340/870.02, 870.03, 340/310 A, 310 R, 310 CP, 825.07, 825.08, 825.54; 364/483; 371/37.7, 69.1

[56] References Cited

U.S. PATENT DOCUMENTS

| | | | |
|---|---|---|---|
| 3,445,814 | 5/1969 | Spalti | 340/870.02 |
| 3,656,112 | 4/1972 | Paull | 340/310 A |
| 3,683,343 | 8/1972 | Feldman et al. | 340/870.02 |
| 3,688,271 | 8/1972 | Rouse | 340/870.03 |
| 3,693,155 | 9/1972 | Crafton et al. | 340/825.02 |
| 3,702,460 | 11/1972 | Blose | 340/825.15 |
| 3,705,385 | 12/1972 | Batz | 340/870.02 |
| 3,706,930 | 12/1972 | Harner | 455/3.3 |
| 3,719,928 | 3/1973 | Oishi et al. | 340/870.03 |
| 3,747,104 | 7/1973 | Pansini | 342/457 |
| 3,815,119 | 6/1974 | Finlay, Jr. et al. | 340/310 R |

(List continued on next page.)

FOREIGN PATENT DOCUMENTS

| | | |
|---|---|---|
| 1121719 | 7/1968 | United Kingdom . |
| 1140251 | 1/1969 | United Kingdom . |
| 1172344 | 11/1969 | United Kingdom . |
| 1400477 | 7/1975 | United Kingdom ............. 340/870.02 |

OTHER PUBLICATIONS

"A Novel System for Managing Electrical Utility Loads", Smith et al., 7th IEEE/PES Transmission & Distribution Conf. (Apr., 1979) pp. 594–599.

"Technology/Remote Control of Power Use", Schuyten, The New York Times, Dec. 27, 1979, p. D2.

"Centralized Load Control And Automatic Meter Reading System For Distribution Line", Hoshino et al., (Nov. 1977) pp. 132–136.

"Bi-Directional Ripple Control System Decabit/Retrobit", Schnieper et al., (Mar. 1976) pp. 6–9.

"Communications Options for Distribution Automation", J. B. Blose in IEEE Region 5 Conference Proceedings (1983) pp. 33–37.

"Home Net" Specification, General Electric Company.

"Product Development Presentation to AEIC/EEI Meter and Service Committees" Buffalo, New York, Apr. 22, 1985.

(List continued on next page.)

Primary Examiner—Michael Horabik

[57] ABSTRACT

A remote utility reading and control system includes a central utility use data bank which communicates by communications link with a plurality of relay modules located at power sub-distribution transformers. Each relay module separately addresses and communicates by PLC with a number of site units in its locality. The site units may include on/off controls for buildings, light systems or single pieces of equipment, or may include utility meters or real power meters. The PLC communication utilizes error checking and message verifying to acquire valid status or measurement signals, which are then transmitted to the central data bank. A CRC error code identifies faulty messages. After multiple interrogation, five responses are stored, and a message is confirmed only when three of five responses are identical. Systems for electricity, water, and gas are described.

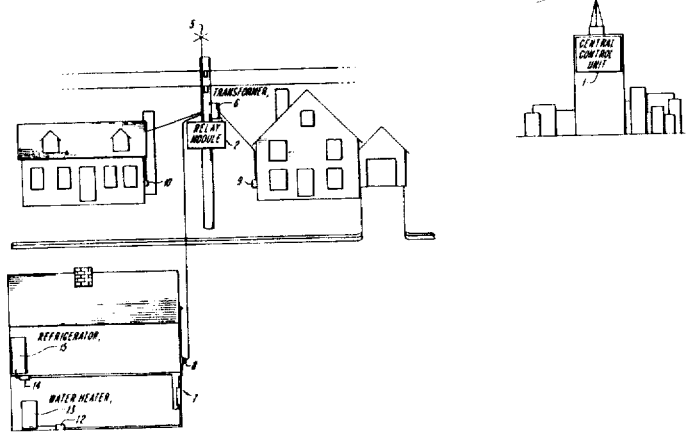

U.S. PATENT DOCUMENTS

| | | | |
|---|---|---|---|
| 3,820,106 | 6/1974 | Yamashita et al. | 340/310 A |
| 3,855,503 | 12/1974 | Ristuccia | 317/27 R |
| 3,900,842 | 8/1975 | Calabro et al. | 340/310 A |
| 3,911,415 | 10/1975 | Whyte | 340/310 A |
| 3,914,757 | 10/1975 | Finlay, Jr. et al. | 340/310 A |
| 3,925,763 | 12/1975 | Wadhwani et al. | 340/825.36 |
| 3,942,168 | 3/1976 | Whyte | 340/310 R |
| 3,942,170 | 3/1976 | Whyte | 340/310 A |
| 3,944,723 | 3/1976 | Fong | 178/3 |
| 3,944,932 | 3/1976 | Fong | 325/427 |
| 3,952,285 | 4/1976 | Falck, Jr. | 340/870,09 |
| 3,967,264 | 6/1976 | Whyte et al. | 340/310 A |
| 3,973,240 | 8/1976 | Fong | 340/310 A |
| 3,980,954 | 9/1976 | Whyte | 325/48 |
| 4,040,046 | 8/1977 | Long et al. | 340/310 CP |
| 4,101,834 | 7/1978 | Stutt et al. | 325/42 |
| 4,107,656 | 8/1978 | Farnsworth | 340/825.15 |
| 4,109,204 | 8/1978 | Kincaid et al. | 325/38 R |
| 4,130,874 | 12/1978 | Pai | 364/514 |
| 4,131,881 | 12/1978 | Robinson | 340/825.53 |
| 4,135,101 | 1/1979 | Young et al. | 307/39 |
| 4,135,181 | 1/1979 | Bogacki et al. | 340/310 A |
| 4,161,720 | 7/1979 | Bogacki | 340/870.03 |
| 4,178,482 | 12/1979 | Ouellette | 179/15 |
| 4,188,619 | 2/1980 | Perkins | 340/310 R |
| 4,190,800 | 2/1980 | Kelly, Jr. et al. | 340/310 A |
| 4,199,761 | 4/1980 | Whyte et al. | 340/695 |
| 4,204,194 | 5/1980 | Bogacki | 340/870.02 |
| 4,204,195 | 5/1980 | Bogacki | 340/870,03 |
| 4,250,489 | 2/1981 | Dudash et al. | 340/825.02 |
| 4,254,402 | 3/1981 | Perkins | 340/310 R |
| 4,264,960 | 4/1981 | Gurr | 364/492 |
| 4,270,206 | 5/1981 | Hughes | 375/9 |
| 4,276,644 | 6/1981 | DeWitte | 371/25 |
| 4,298,986 | 11/1981 | Hughes | 375/84 |
| 4,300,126 | 11/1981 | Gajjar | 340/310 A |
| 4,301,445 | 11/1981 | Robinson | 340/825.54 |
| 4,302,750 | 11/1981 | Wadhwani et al. | 340/870.02 |
| 4,307,464 | 12/1981 | Hughes | 375/67 |
| 4,308,619 | 12/1981 | Hughes | 375/119 |
| 4,310,805 | 1/1982 | Hackert et al. | 331/1 A |
| 4,315,251 | 2/1982 | Robinson et al. | 340/310 A |
| 4,323,882 | 4/1982 | Gajjar | 340/310 R |
| 4,344,180 | 8/1982 | Cummiskey | 371/69.1 |
| 4,349,879 | 9/1982 | Peddie et al. | 364/492 |
| 4,375,100 | 2/1983 | Tsuji et al. | 371/37.7 |
| 4,393,501 | 7/1983 | Kellogg et al. | 371/33 |
| 4,396,915 | 8/1983 | Farnsworth et al. | 340/870.03 |
| 4,400,811 | 8/1983 | Brown et al. | 371/69.1 |
| 4,427,968 | 1/1984 | York | 340/310 R |
| 4,429,299 | 1/1984 | Kabat et al. | 340/310 R |
| 4,446,462 | 5/1984 | Ouellette et al. | 340/825.07 |
| 4,455,655 | 6/1984 | Galen et al. | 371/37.7 |
| 4,462,109 | 7/1984 | Hughes | 375/97 |
| 4,475,217 | 10/1984 | Hughes | 375/81 |
| 4,517,562 | 5/1985 | Martinez | 340/825.07 |
| 4,584,685 | 4/1986 | Gajjar | 371/35 |
| 4,628,313 | 12/1986 | Gombrich et al. | 340/870.02 |
| 4,641,322 | 2/1987 | Hasegawa | 375/1 |
| 4,641,325 | 2/1987 | Hughes | 375/97 |
| 4,862,493 | 8/1989 | Venkataraman et al. | 379/107 |

OTHER PUBLICATIONS

"Intellimeter (TM) Installation Instructions" Document No. 960005, Rev. A, Jul., 1985.

"Product Development Presentation to EEI/AEIC Meter and Service Committee" Dearborn, Michigan Sep. 19–21, 1983.

"Intelligent Utility Metering System" Utility Systems Corporation, Torrance, California (undated).

EPRI Research Report 1940-13 pp. 3.7 to 3.8 (Nov., 1986).

Robinton Products, Inc., Promotional Brochure for Electric ARM System.

Robinton Products Inc., Promotional Brochure for Load Profile Recorders.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 and 4–6 are cancelled.

Claims 2, 3, 7, 9, 10, 12, 14, 15 and 18 are determined to be patentable as amended.

Claims 8, 11, 13, 16 and 17, dependent on an amended claim, are determined to be patentable.

New claims 19 and 20 are added and determined to be patentable.

2. A system [according to claim 1] *for monitoring or controlling utility use at a plurality of use sites in a public utility network, such system comprising*
   interface means for interfacing a central information bank with a *radio* communications link independent of power lines *so as to enable the information bank to communicate with a plurality of separately addressable relay modules,*
   at least one relay module, *each relay module being located at a power line transformer and electrically interconnected to the secondary side thereof, and* including
   (a) master communications means for receiving and sending information along the communications link to the central information bank,
   (b) information storage means for storing information,
   (c) relay communications means, distinct from the master communications means, for separately addressing and communicating with a plurality of local site units via power line carrier (PLC), and
   (d) control means *comprising processing means for processing at least a portion of information received by the master communications means for transmission of a message by the relay communications means and for processing information received by the relay communications means for transmission of a message by said master communications means, said control means* configured for selectively interconnecting said storage means with said master communication means and with said relay communications means so as to relay information between the central information bank and the plurality of local site units, *said control means being responsive to a message transmitted over the power line from a site unit to said relay communications means, for relaying information included in the message to the central information bank, and*
   a plurality of local site units each located at a local site and addressable by a particular relay module, each said local site unit including site PLC communications means for communicating with its particular relay module via power line carrier, each said local site unit also including at least one of means for indicating utility use or means for controlling the flow of utility, wherein a relay module further comprises
   means for repeatedly polling an individual site unit so as to receive multiple responses therefrom, and
   means for comparing said multiple responses received in accordance with said repeated polling from a said site unit so as to identify a consistent message.

3. A system according to claim 2, wherein the *radio* communications link is an FM radio link, and wherein the interface means includes means for interfacing the information bank with an FM transmitter and receiver.

7. A system according to claim [5] *2*, wherein a relay module and a site unit each include code checking means, for identifying communications errors.

9. A system for [the] communication, between a central use information bank and plural end user sites within a utility distribution system, of utility use information indicative of utility use at the plural end user sites, such system comprising
   interface means for interfacing the use information bank with a *radio* communications link independent of power lines of said utility distribution system,
   [at least one relay module] *a plurality of relay modules* each including means for communicating information along the communications link with the information bank, and means for communicating information via power line carrier with a plurality of site units at plural end user sites, *each said relay module comprising processing means for processing for retransmission at least a portion of information received from the use information bank and information received from the site units,* and
   a plurality of site units, each located at a specific end user site and responsive to an address signal transmitted by power line carrier from a specific said relay module, for transmitting utility use information of the specific end user site by power line carrier to said specific relay module,
   wherein each said site unit communicates with a single said relay module, and each said relay module is located at a distribution transformer and connected to the secondary site thereof so as to communicate with a plurality of nearby site units, each located at a site receiving power through said transformer, *the site units and relay modules each communicating over the power line at a frequency such that its communications are substantially blocked at the distribution transformer from reaching primary lines attached to the transformer, whereby each relay module polls site units coupled to the secondary side of a distribution transformer without interference from site units or relay modules connected to another distribution transformer.*

10. A system according to claim 9, wherein a relay module includes polling means for polling site units, and wherein the polling means includes means for multiply-polling a site unit and for comparing [communications] *a plurality of messages* received responsive to *separate ones of* said polling from the site unit so as to identify confirmed site use information.

12. A system according to claim 11, wherein a relay module includes CRC message means utilizing a first generator polynomial for communications sent to an end user site, and utilizing a second generator polynomial *for communications* received from an end user site.

14. A relay module for controllably communicating with a plurality of PLC-addressable utility usage units, such module comprising

- interface means for receiving and sending communications over a first, external, communications link to a central information source
- polling means for polling over a second, PLC, communications link, a plurality of utility usage units in power line communication with the module so as to communicate usage information to said units and receive usage information from said units
- storage means for storing usage information, and
- relay control means for controlling the interface means, the storage means and the polling means so as to relay utility usage information between said central source and said plurality of utility usage units[.], *said relay control means comprising processing means for processing for retransmission at least a portion of information received from the central source and at least a portion of information received from the utility usage units, said control means operating under control of instructions in the information storage means for communicating data signals in formatted digital form with the master communications means and with the relay communications means, being responsive to a message from a usage unit transmitted over the power line from the usage unit to said relay communications means, for storing and relaying information included in the message to the central information bank, and*
- *PLC coupling means for coupling the polling means to the secondary side of a secondary power distribution transformer for communicating with usage units connected thereto, said PLC communications link sending and receiving communications which are substantially blocked from propagating to primary lines feeding the secondary distribution transformer.*

15. A relay module according to claim 14, wherein the polling means includes means for multiply-polling a utility usage unit so as to receive multiple responses from the unit, and wherein the [control] *relay* module further comprises means for comparing the multiple responses *received* from the unit to identify confirmed information therein.

18. A relay module for controllably communicating with a plurality PLC-addressable utility usage units *in a utility system consisting of many user sites located along secondary sides of many distribution transformers, the utility usage units being located at respective user sites*, such module comprising

- interface means for receiving and sending data over a first communications link independent of power lines, *directly* to a central information source,
- polling means for polling over a power line communications link, a plurality of separately addressable utility usage units in power line communication with the relay module so as to communicate data to said units and receive data from said units, *said polling means coupling communications into a said secondary side of one secondary distribution transformers such that communications are substantially blocked from reaching a primary side of said distribution transformer,*
- storage means for storing said data, and
- relay control means for controlling the interface means, the storage means and the polling means so as to relay utility usage information between said central source and said plurality of usage units by successively polling said plurality of usage units, storing data received therefrom, and subsequently communicating the stored data as a block of data via said interface means, *said relay control means comprising processing means for processing at least a portion of information received from the central source and at least a portion of information received from the utility usage units, the usage units and said polling means each transmitting signals over the power line at a frequency that is substantially blocked at the distribution transformer, whereby the relay module may poll usage units coupled to the secondary side of said distribution transformer without interference from a remote usage unit or relay module connected to another distribution transformer.*

19. *A system for monitoring or controlling utility use at a plurality of use sites in a utility network consisting of many use sites located along secondary sides of many distribution transformers, such system comprising*

- *interface means for interfacing a central information bank with a radio communications link,*
- *said radio communications link is independent of power lines and coupled to the interface means to enable the information bank to communicate with a plurality of separately addressable relay modules,*
- *a plurality of relay modules, each relay module being coupled at power line communication frequencies across the secondary side of a power line transformer, and including*
  - *(a) master communications means for receiving and sending information along the radio communications link to the central information bank,*
  - *(b) information storage means for storing information,*
  - *(c) relay communications means, distinct from the master communications means, for separately communicating over the power line with a separate plurality constituting its own exclusive set of local site units connected to the secondary side of the power line transformer, and*
  - *(d) control means comprising processing means for processing at least a portion of information received by the master communication means for transmission of a message by the relay communications means and at least a portion of information received by the relay communications means for transmission of a message by said master communications means, said control means configured for selectively interconnecting said storage means with said master communication means and with said relay communications means to acquire and relay information bidirectionally between the central information bank and the plurality of local site units, said control means operating under control of instructions in the information storage means for communicating data signals in formatted digital form with the master communications means and with the relay communications means and being responsive to a message including a site unit address transmitted from a site unit to said relay communications means, for relaying information included in the message to the central information bank, and*
- *a plurality of local site units each located at a use site and addressable by a relay module, each said local site unit including site PLC communications means for communicating with one said relay module over the power line with different transmission and receiving signals, each said local site unit also including at least one of means for indicating utility use or means for controlling the flow of utility,* the site PLC communications means and the relay communications means each communicating messages which are substantially blocked from reaching primary power lines.

20. A relay module for controllably communicating with a plurality of power line addressable utility usage sites, such module comprising radio interface means for receiving and sending communications over a first, external, radio communications link to a central information source, polling means for polling over power lines by a second communications link, a plurality of site units in power line communication with the module so as to communicate information to said units and receive information from said units, confirmation means, for confirming message information received from said units, storage means for storing message information, and relay control means for controlling the interface means, the storage means and the polling means so as to relay message information between said central source to said plurality of site units and to relay confirmed information from said plurality of site units to said central source, said relay control means comprising processing means for processing at least a portion of information received from the central source and at least a portion of information received from the site units, said polling means sending and receiving messages over the power line which are coupled into the secondary side of a local distribution transformer and are substantially blocked at the local distribution transformer from passing to primary lines, whereby received messages are free of interfering messages or transmissions of other units connected to a utility.

* * * * *